United States Patent
Zink et al.

(10) Patent No.: US 6,986,932 B2
(45) Date of Patent: Jan. 17, 2006

(54) MULTI-LAYER WIPING DEVICE

(75) Inventors: Ronald Joseph Zink, Cincinnati, OH (US); Michael Bernard Dugas, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 204 days.

(21) Appl. No.: 10/192,372

(22) Filed: Jul. 10, 2002

(65) Prior Publication Data

US 2003/0021952 A1 Jan. 30, 2003

Related U.S. Application Data

(60) Provisional application No. 60/308,749, filed on Jul. 30, 2001.

(51) Int. Cl.
| | |
|---|---|
| D21H 27/30 | (2006.01) |
| D21H 27/32 | (2006.01) |
| B32B 5/02 | (2006.01) |
| B32B 3/10 | (2006.01) |

(52) U.S. Cl. .................. 428/138; 428/198; 428/212; 428/221; 428/292.1; 428/297.1

(58) Field of Classification Search ............ 428/292.1, 428/411.1, 212, 311.1, 297.1, 221, 137, 138, 428/198, 533, 534, 535, 537.5; 162/112, 162/128
See application file for complete search history.

(56) References Cited

U.S. PATENT DOCUMENTS

| | | | |
|---|---|---|---|
| 3,709,764 A | | 1/1973 | Thomas |
| 4,239,792 A | | 12/1980 | Ludwa |
| 4,338,366 A | | 7/1982 | Evans et al. |
| 4,429,014 A | * | 1/1984 | Isner et al. .............. 428/152 |
| 4,515,703 A | | 5/1985 | Haq |
| 4,603,069 A | * | 7/1986 | Haq et al. .............. 428/76 |
| 4,675,226 A | | 6/1987 | Ott |
| 4,797,310 A | | 1/1989 | Barby et al. |
| 4,888,229 A | * | 12/1989 | Paley et al. .............. 428/192 |
| 5,030,500 A | | 7/1991 | Perdelwitz, Jr. et al. |
| 5,085,914 A | | 2/1992 | Perdelwitz, Jr. et al. |
| 5,302,446 A | | 4/1994 | Horn |
| 5,652,049 A | * | 7/1997 | Suzuki .............. 442/387 |
| 5,671,498 A | | 9/1997 | Martin et al. |
| 6,060,149 A | * | 5/2000 | Nissing et al. .............. 428/138 |

(Continued)

FOREIGN PATENT DOCUMENTS

EP 0 112 654 A2 7/1984

(Continued)

*Primary Examiner*—Rena Dye
*Assistant Examiner*—Camie S. Thompson
(74) *Attorney, Agent, or Firm*—Peter D. Meyer; David K. Mattheis; David M. Weirich

(57) ABSTRACT

A multi-layer article comprised of a first and second layers bonded together. The first layer is comprised of two plies and a third material between the two plies. The two plies are bonded together at a plurality of discrete bond sites. The bonding of the plies form an interior region between the plies.

The third material of the first layer is disposed between and substantially fills the interior region between the plies. The third material differs from the first and second plies by at least one material property selected from thermal properties, elongation properties, elastic properties, or conductive properties. The third material is apertured in regions coincident with the bond sites of the first layer and the first and second plies are joined to each other through the apertures.

The second layer of the article comprises a cellulosic web.

12 Claims, 5 Drawing Sheets

U.S. PATENT DOCUMENTS

| | | | |
|---|---|---|---|
| 6,106,925 A * | 8/2000 | Palumbo | 428/137 |
| 6,110,848 A * | 8/2000 | Bouchette | 442/384 |
| 6,129,815 A * | 10/2000 | Larson et al. | 162/112 |
| 6,132,841 A | 10/2000 | Guthrie et al. | |
| 6,280,757 B1 * | 8/2001 | McAtee et al. | 424/402 |
| 6,808,791 B2 * | 10/2004 | Curro et al. | 428/198 |

FOREIGN PATENT DOCUMENTS

| | | |
|---|---|---|
| EP | 0 992 338 A2 | 4/2000 |
| WO | WO 99/37476 | 7/1999 |
| WO | WO 00/76430 A1 | 12/2000 |
| WO | WO 01/45616 A1 | 6/2001 |

* cited by examiner

MULTI-LAYER WIPING DEVICE

CROSS REFERENCE TO RELATED APPLICATIONS

This application claims the benefit of U.S. Provisional Application No. 60/308,749 filed Jul. 30, 2001.

FIELD OF INVENTION

A multi-layer article. More particularly, an article with at least one layer that is an absorbent cellulosic web, and at least one layer that is a multi-ply laminate with at least three plies, including a center ply that is apertured.

BACKGROUND OF THE INVENTION

Laminate articles formed by the joining of discrete webs in a layered relationship are well known in the art. Laminate articles include laminates of dissimilar materials. The materials may be dissimilar in mechanical tensile properties, thermal properties, or visual/tactile properties. For example, a nonwoven web may be joined to a relatively stiff fabric to provide for a soft surface feel to the fabric.

The dissimilar materials may be joined by melt bonding, adhesive bonding, ultrasonic bonding, and the like. Bonding methods are often determined by the materials themselves, and often require adhesive bonding. For example, a laminate of materials having widely differing melt properties may require an adhesive layer between laminate layers. Even materials having similar melt properties, such as nonwoven and thermoplastic film materials are often joined by adhesive for adequate bonding to prevent unwanted delamination. Although adhesive may be necessary, such processing methods can be expensive due to the addition of adhesive, and the resulting laminate is often relatively stiff, depending on the laminate materials and the level of adhesive added.

Often laminate articles are intended to combine properties of the constituent layers to achieve synergistic benefits. For example, a multi-layered nonwoven laminated article could be intended for use as a substitute for a woven web such as a textile web. A web comprised of a layer of thermoplastic man-made fibers and a layer of cellulose-based fibers is known. The cellulose-based fiber layer is disclosed as thermally bonded to the thermoplastic man-made fiber layers at spaced apart locations. However, it appears that thermal bonding between all the layers is necessary to produce the requisite bonding.

EP-A-112,654 issued to Haq, et al. discloses a laminate comprising two sheets of nonwoven fabric or the like having sandwiched between them a solid core material which may be a highly porous, optionally liquid-containing, polymer. The two outer sheets are bonded to each other, without involving the core material, by means of a plurality of small, spaced bonding points, for example, spot-welds. Preferably the core material is in continuous sheet form and is perforated to accommodate the bonding points. However, it appears it would present a significant processing problem to register the perforations of the core material in order to have the outer layers bonded therethrough.

Nonwoven webs are beneficial as components of disposable consumer products, such as diapers, incontinence briefs, training pants, feminine hygiene garments, and the like, as well as in wipes such as disposable wet wipes. However, used alone, such nonwovens are limited in the range of beneficial properties, including visual, tactile, strength or absorbent properties due to the limits of known methods of making, particularly as compared to woven or knitted materials. Importantly, laminates of nonwoven webs and other materials for use in disposable consumer products have heretofore been limited due to processing limitations, including incompatible materials (e.g., thermally dissimilar materials), cost considerations (e.g., adhesive lamination costs) or tactile properties (e.g., softness and visual aesthetics).

Also known in the art is a laminate of at least three layers with the outermost layers bonded to each other through apertures formed in the center or inner layer(s) during the bonding process. Such laminates have a variety of possible properties depending upon the choice of materials for the outer and inner layers. It is possible to achieve a soft, cloth-like hand feel through the use of nonwoven outer layers, and to add absorbency by using a cellulosic center layer similar to a BOUNTY® paper towel. The continuity of the inner layer is disrupted however, because the layer is apertured at the bond sites between the outer layers.

Accordingly, it would be desirable to have laminate articles with webs of dissimilar material properties, which are not dependent upon thermal compatibility of each constituent layer for structural integrity.

Additionally, it would desirable to have a laminate article comprising both nonwoven webs and cellulosic webs.

Additionally, it would be desirable to have a laminate web formed by joining the constituent layers without adhesive.

Further, it would be desirable to have a multi-layer web combining the softness and durability of a nonwoven layer with the absorbency of a continuous cellulosic layer.

SUMMARY OF THE INVENTION

A multi-layer article that is disposable, soft, absorbent, and durable enough to be used for cleaning. The article comprises at least a first layer and a second layer bonded to each other. The first layer is further comprised of a first ply, a second ply, and a third material. The first and second plies are joined in a face-to-face relationship at a plurality of discrete bond sites. The first and second plies form an interior region between them that is substantially filled by the third material.

The third material is differentiated from the first or second ply by at least one material property selected from: thermal properties, elongation properties, elastic properties, or conductive properties. The third material may be a cellulosic web. The third material is apertured in regions coincident with the bond sites of the first and second plies. The first and second plies are joined to each other through the apertures.

The second layer is comprised of a cellulosic web, the web may be further comprised of multiple plies. A third layer may be included which is similar, or identical, to the first layer.

DETAILED DESCRIPTION OF THE INVENTION

A multi-layer article comprised of at least a first layer and a second layer. The layers are bonded at one, or a plurality of, bond sites to each other in a face to face relationship. The bond site(s) comprises a macroscopic pattern on the face of the article.

The pattern may include bonding along the edge of the article as well as disposed across the interior face of the article. The edge of the article is considered to be the area of the article from the perimeter of the article, extending inward about one inch (25 mm). The remainder of the area of the article is considered to be the interior face of the article. The bonding along the edge prevents delamination of the article at the edge. Delamination, or the separation of the layers of the article, reduces the unitary feel of the article and is therefore undesirable.

The layers may be continuously bonded to each other. An example of continuous bonding is an article with bonding at the edge that extends uninterrupted along the entire perimeter of the article.

The layers may also be bonded with a pattern comprised of a plurality of discrete bonding sites. The shape of the bond sites is not critical to the invention. Square, oval, circular, triangular, line segments, and arc segments have all been found to produce an acceptable article. The bond sites of the article, must be larger in area than the bond sites of the first layer. It is believed that article bond sites that are smaller than the bond sites of the first layer, which are coincident with bond sites of the first layer will produce an aperture through the first layer. In such an instance, no bonding between the first and second layers will occur.

The bonding area of the article, as used herein, is defined as the sum of the areas of all the bond sites between the first and second layers, divided by the overall area of the article. Bonding area is expressed as a percentage. For example, an article with an area of 10 square inches, where the sum of the areas of all the bonding sites between the layers is one square inch has a bonding area of 10%. The bond sites between the first and second plies of the first layer are not included in this calculation.

Higher bonding areas result in a more unitary article. Higher bonding areas also reduce the overall absorbent capacity of the article by reducing the caliper of a greater portion of the article. Higher bonding areas also result in a stiffer article and in a reduction in the softness of the article. This is because there is a reduction or alteration in the surface properties of the first and second layers of the article in the regions of the bond sites. The melting of the fibers of the first layer reduces the softness of the article and the reduction in the caliper of the second layer reduces the absorbent capacity of the article.

An article bonded only at the edge may have a bonding area as low as 2%. Articles with bonding throughout the interior face as well as the edge may have bonding areas as high as about 60%. One particular embodiment of the article, which is soft, absorbent and has a clothlike feel has a bonding area of between 3% and 10%. The actual bonding area in such an embodiment depends upon the size and number of bonds along the edge.

The bond sites disposed throughout the interior of the article provide structural unity for the article. These sites provide the article with a greater unitary hand feel that is more like a woven textile or clothlike. The pattern of the interior bond sites is not critical to the invention and any pattern of sites producing the desired level of unitary feel without compromising the absorbent capacity, or softness of the article, may be used. Geometrically regular patterns or irregular patterns may be used. Patterns in any shape comprised of a series of discrete bond sites, also of any shape, may be used.

Figure 4A:
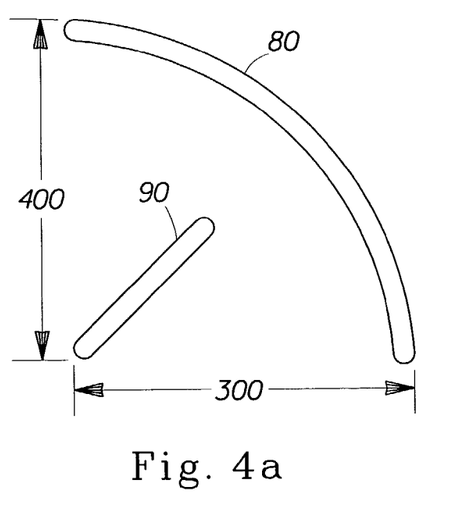
FIG. 4A is a magnified plan view of one bond site in an embodiment of the present invention.
Figure 4B:
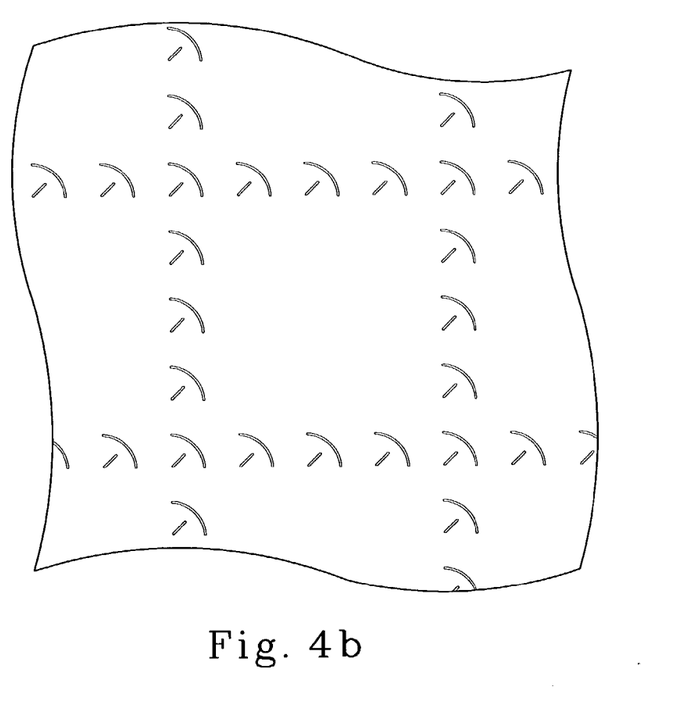
FIG. 4B is a plan view of a portion of the pattern of bond site of an embodiment of the present invention.

FIGS. 4A and 4B illustrate the bond sites shape and bond site pattern of one embodiment of the present invention. In such an embodiment, the dimensions 300 and 400 are about 0.3125 inches (8 mm). The bond sites in such an embodiment are arrayed in a pattern across the interior face of the article similar to the pattern shown in FIG. 4B. In such a pattern the bond sites are located on centers spaced about 0.5 inches (12.5 mm) apart. The rows and columns of sites in the pattern are spaced about two to three inches (50 to 75 mm) apart. A similarly shaped, but larger, bond site is utilized along the edge of the article in such an embodiment. This larger bond site has dimensions 300 and 400 of about 0.5 inches (12.5 mm) and the sites are arrayed on centers spaced 0.625 inches (16 mm) apart.

The continuity of the layers is maintained with both continuous and discrete bonding. Although the caliper of the second layer is reduced in the bond sites the absorbent capabilities of the layer are not eliminated. The layers are not pierced and maintain their continuity. For the cellulosic second layer, this continuity allows absorbed fluids to easily migrate throughout the sheet. This ease of fluid migration is important to maintaining the rate of absorption of the cellulosic web and the article.

The First Layer:

The first layer of the present invention can be made according to the disclosure in U.S. patent application Ser. No. 09/089,356.1, filed Dec. 20, 2000 for Curro et al., said application hereby incorporated by reference.

Figure 2:
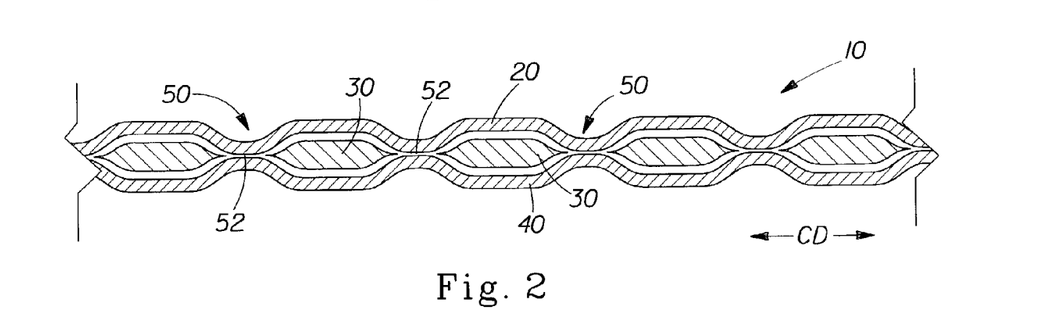
FIG. 2 is a cross sectional view of an embodiment of the first layer of the laminate article shown in FIG. 1.

The first layer 10 of the present invention comprises at least three plies, disposed in a layered, face-to-face relationship, as shown in FIG. 2. The plies should be sufficiently thin to be processible as described herein, but no actual thickness (i.e., caliper) is considered limiting. A first outer ply 20, is preferably thermally bondable, and may be a nonwoven web comprising a sufficient quantity of thermoplastic material, the ply having a predetermined extensibility and elongation to break. "Sufficient quantity" means a quantity of thermoplastic material adequate to enable enough thermal bonding upon application of heat and/or pressure to produce a unitary layer. A second outer ply, 40, is preferably the same material as first outer ply 20, but may be a different material, also being thermally bondable and having a predetermined extensibility and elongation to break.

In addition to thermoplastic nonwoven materials, the outer plies of the first layer can comprise a polymeric film, for example a polyolefinic (e.g., PP or PE) thin film. If the entire outer plies are not uniformly thermoplastic, at least sufficient amounts to effect melt bonding must be thermoplastic. Conjugate fibers, such as bicomponent fibers can be used in the outer layers to facilitate thermal bonding of the outer layers. The outer plies of the first layer can comprise a formed film, such as a three-dimensional formed film having micro-apertures such as described in commonly-assigned U.S. Pat. No. 4,629,643 issued to Curro et al. on Dec. 16, 1986, and U.S. Pat. No. 4,609,518, issued to Curro et al. on Sept. 2, 1986, both of which are hereby incorporated herein by reference.

The nonwoven outer plies may be elastic, highly elastic or nonelastic. The nonwoven plies may be any melt-fusible web, including a spunbonded ply, a meltblown ply, or a bonded carded ply. If the nonwoven ply is a web of meltblown fibers, it may include meltblown microfibers. The nonwoven ply may be made of fiber forming polymers such as, for example, polyolefins. Exemplary polyolefins include one or more of polypropylene, polyethylene, ethylene copolymers, propylene copolymers, and butene copolymers. The nonwoven plies may also comprise synthetic cellulose fibers, or extruded starch fibers. The nonwoven plies can have a basis weight between about 10 to about 90 grams per square meter (gsm), or in another embodiment about 15 to about 30 gsm.

The nonwoven outer plies may themselves be a multi-layer material having, for example, at least one layer of a spunbonded web joined to at least one layer of a meltblown web, a bonded carded web, or other suitable material. For example, the nonwoven ply may be a multi-layer web having a first layer of spunbonded polypropylene having a basis weight from about 0.2 to about 8 ounces per square yard, a ply of meltblown polypropylene having a basis weight from about 0.2 to about 4 ounces per square yard, and a second ply of spunbonded polypropylene having a basis weight from about 0.2 to about 8 ounces per square yard. Alternatively, the nonwoven plies may be a single layer of material, such as, for example, a spunbonded ply having a basis weight from about 0.2 to about 10 ounces per square yard or a meltblown ply having a basis weight from about 0.2 to about 8 ounces per square yard.

The nonwoven outer plies may also be a composite made up of a mixture of two or more different fibers or a mixture of fibers and particles. Such mixtures may be formed by adding fibers and/or particulates to the gas stream in which meltblown fibers or spunbond fibers are carried so that an intimate entangled co-mingling of fibers and other materials, (e.g., wood pulp, staple fibers, synthetic cellulose, starch fibers and particles) occurs prior to collection of the fibers. Prior to processing, the nonwoven web outer ply of fibers can be joined by bonding to form a coherent web structure. Suitable bonding techniques include, but are not limited to, chemical bonding, thermobonding, such as point calendering, hydroentangling, and needling.

At least one third central ply 30 is disposed between the two outer plies. The first layer 10 is processed by joining means, such as by ultrasonic welding, or thermal calendaring to provide a plurality of melt bond sites 50 that serve to couple the outer plies 20 and 40, thereby forming the constituent plies into a unitary layer. When joined together, the two outer plies form an interior region between them. The interior region is the space between the outer plies surrounding the bond sites 50. In one embodiment, central ply 30 substantially fills the interior region, central ply 30 being apertured coincident the bond sites 50.

While the first layer 10 is disclosed primarily in the context of nonwoven plies and composites, in principle the first layer 10 can be made out of any materials that meet the requirements, (e.g., melt properties, extensibility) as disclosed herein. For example, the outer plies 20 and 40 can be thermoplastic films, micro-porous films, apertured films, and the like. Central ply 30 can be paper, including tissue paper, metal, including metal foil; other non-thermoplastic web material, woven fabric, and the like. In general, it is required that outer ply materials be flexible enough to be processed as described herein.

Non-Apertured Embodiment

In one embodiment, as shown in cross-section in FIG. 2, central ply 30 can be apertured, without aperturing the two outer plies to provide a three-ply laminate characterized by the first layer 10 (as a whole) being un-apertured, while central ply 30 is apertured. Importantly, the first layer can be made without requiring registration of the plies and material to ensure bonding of the outer plies through the apertures of central ply 30. One way of describing the embodiment of a layer 10 as described above, is that the unitary layer 10, when viewed orthogonally by the unaided human eye from a distance of approximately 50 cm, exhibits no apertures or perforations through the entire laminate, but bond sites 50 are nevertheless visible.

As shown in FIG. 2, central ply 30 is chosen such that when the constituent plies of layer 10 are processed, portions of central ply 30 in the region of the melt bond sites 50 separate to permit the first outer ply 20 to melt bond directly to the second outer ply 40 at the interface of the two materials 52 at melt bond sites 50. Thus, apertures in central ply 30 are formed in the lamination step by displacement, just prior to the bonding of the outer plies. In this manner, central ply 30 can be provided as an unapertured ply, avoiding complex registration steps to align apertures in registry with bond sites when laminated. Further, third material 30 need not be thermally compatible with outer plies 20 and 40. Central ply need not be a thermoplastic material, and need not even have a melting point. It simply needs to be displaceable by the forces exerted by the processing equipment as detailed below. Therefore, one way of describing the first layer of the present invention is to distinguish the central ply as being a material differentiated from the materials of the first or second plies by at least one material property selected from thermal properties, or elongation properties. By "thermal properties" is meant primarily thermal melt properties, such that the central ply has no melting point, or if it has a melting point, it is preferably at least about 10 degrees Centigrade higher, more preferably about 20 degrees Centigrade higher than either outer ply, and can be 100 degrees Centigrade higher than either outer ply. By "elongation properties" is meant that in tension, the material of the central ply exhibits an elongation to break that is at least 10% less than either outer ply, more preferably 50% less than either outer ply, and can be greater than 100% less than either outer ply. Thus, the central ply can be extensible, while either outer ply can be highly extensible.

An advantage of such a laminated web is that, in some embodiments, e.g., for solid core central ply 30 materials (i.e., a continuous sheet, that is, not having substantial apertures, gaps, or other voids), it results in a unitary web having an apertured central ply 30 in full, intimate contact with the outer plies 20, and 40. By "full" and "intimate" is meant that central ply 30 fills all the unbonded regions between outer plies 20 and 40 such that outer plies 20 and 40 do not contact except at the bond sites 50. Of course, it is recognized that many materials of interest have significant air content, and filling "all" the unbonded region between outer plies 20 and 40 is not meant to imply that all air content is removed.

Central ply 30 can be involved, or participate, in the bonding between outer plies 20 and 40. By "involved" is meant that the central ply can, to some extent, be in intimate contact with, and possibly partially merged with, one or both immediate outer plies. The involvement may be due to actual melt bonding about the perimeter of bond site 50 (e.g., for thermoplastic central plies 30), or it may be due to mechanical interaction, such as by entanglement (e.g., for cellulosic fibrous central ply 30 between fibrous nonwoven plies), also about the perimeter of bond site 50.

Such separation of central ply 30 can occur by shearing, cutting, or otherwise fracturing the central ply 30, and displacing the material of the central ply 30 sufficiently to permit thermal bonding of the two outer plies 20 and 40. Thus, central ply 30 must be chosen to have properties that permit such displacement. Therefore, central ply 30 should have one or more of the properties of relatively low extensibility, relatively high frangibility, or relatively high deformability, such that the material of central ply 30 can be "squeezed" or otherwise displaced out of the region of thermal bond sites 50. Importantly, it is not required that the central ply 30 be melted out of the region of the thermal bond sites. Thus, central ply can be elastic, highly elastic, extensible, or highly extensible, depending on the desired end results and purposes of the resulting unitary web.

Figure 3:
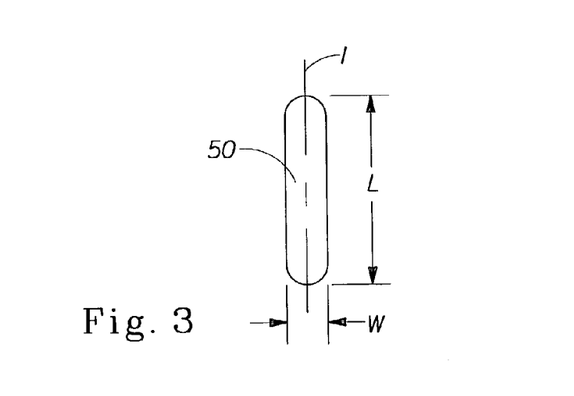
FIG. 3 is a magnified detail view of one bond site of the first layer of the present invention.

Without being bound by theory, it is believed that to accomplish the displacement of central ply 30 to form apertures therein and to bond the outer plies, the thermal point calendaring described below should form thermal bond sites having a narrow width W dimension and a high aspect ratio. For example, FIG. 3 shows the melt area of a single melt bond site 50 having a narrow width dimension W and a high aspect ratio, i.e., the length, L, is much greater than the width, W. The length L should be selected to permit adequate bond area while width W is sufficiently narrow such that the protuberance used to form the bond site (as described below) can cut, shear, displace, or otherwise pierce the central ply 30 at the region of the bond sites by the method described below. Width W can be between about 0.003 inches and 0.020 inches, but in a preferred embodiment, is between about 0.005 inches and 0.010 inches, and may be adjusted depending on the properties of central ply 30.

It is believed that the aspect ratio of melt bond site 50 can be as low as about 3 (i.e., ratio of L/W equals 3/1). It can also be between about 4 and 20. In one preferred embodiment, the aspect ratio was about 10. It is believed that the aspect ratio of the melt bond sites 50 is limited only by the corresponding aspect ratio of the point bonding protuberances of the calendaring roller(s), as detailed below.

Figure 1:
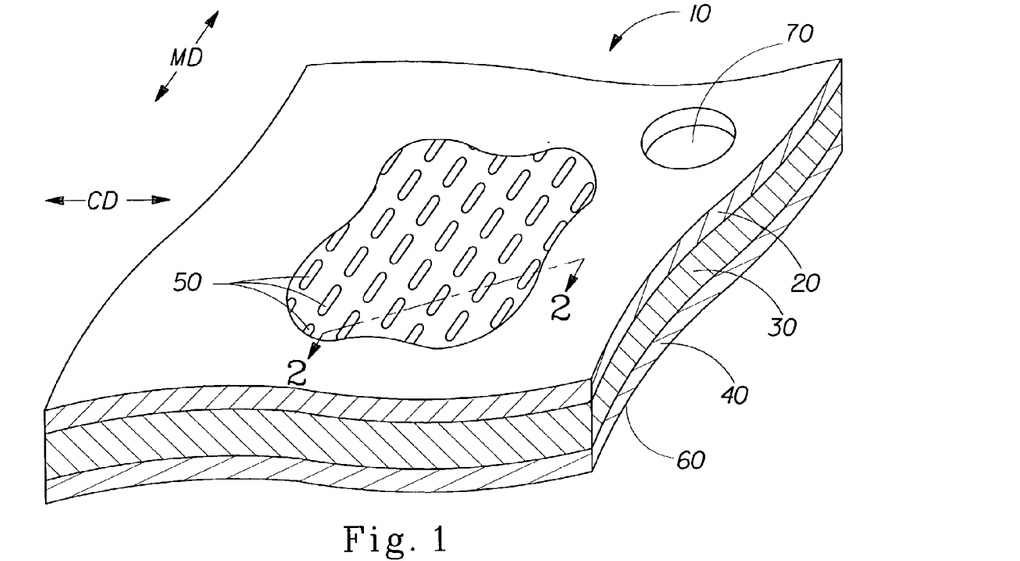
FIG. 1 is a perspective of one embodiment of the laminate article of the present invention.

In one embodiment, the longitudinal axis of each bond site, 1, which corresponds directionally to the length dimension of bond site 50, is disposed in a regular, repeating pattern oriented generally parallel to the machine direction, MD as shown in FIG. 1. But the longitudinal axis of each bond site may be disposed in a regular, repeating pattern oriented in the cross machine direction, or randomly oriented in a mixture of cross and machine directions. For example, the bond sites 50 can be disposed in a "herringbone" pattern.

When nonwoven webs are used as constituent plies of first layer 10, an important distinction should be drawn between bond sites 50 which bond together outer plies 20 and 40, and thermal bond sites that may be present in the constituent plies themselves. For example, nonwoven webs are typically consolidated by thermal bonding in a regular pattern of discrete spaced apart fused bonding areas, such as the pattern disclosed in U.S. Pat. No. 3,855,046 to Hansen et al., and the patterns shown generally in FIG. 5 of U.S. Pat. No. 5,620,779 to Levy et al. Other films, nonwoven webs, and the like may have thermal embossments for aesthetic reasons. Therefore, in the unitary web 10 there may be many thermal bond sites, some of which are bond sites 50, and others which are bond sites in the base nonwoven, for example.

The bond sites of the base nonwoven do not typically have an aspect ratio greater than about 1, so that these bonds do not typically form apertures in the constituent ply during the stretching step disclosed below. Also, the spacing of such bond sites is typically a repeating pattern of bonded and unbonded area which may or may not provide for machine direction (MD) columns of bonded area next to columns of unbonded area. After forming bond sites 50, however, there is not likely to be any significant MD columns of unbonded areas; the overall bond pattern of any constituent nonwoven fabric is a combination of existing bonded areas and bond sites 50. Together the two sets of bond sites result in a complex pattern of bond sites that may or may not be described as columnar, regular, or uniform.

The resulting web of the first layer, as shown in cross-section in FIG. 2, is a laminate web 10 that is itself unapertured, but the central ply 30 is apertured coincident the regions of the bond sites 50. As stated above, by "unapertured" is meant that, on the whole, the laminate web 10 is considered unapertured. It is recognized that the un-apertured laminate web 10 of the first layer may have localized cut through, or tearing at bond sites 50 due to materials and processing variability or post lamination handling. Ideally, such cut through of the entire web is minimized and eliminated. Likewise, it is recognized that in some instances, there may not be complete displacement of the central ply 30 at all locations of bond sites 50 such that some localized portions of central ply 30 may not be apertured (and the outer plies not bonded). Nevertheless, the description herein is made for the laminate web 10 as a whole, and is not meant to be limited by aberrations or anomalies due to potential material or processing variables.

The central ply 30 itself need not be thermally compatible with the outer plies. The central ply 30 need not even be melt processible. It can be, for example, a cellulosic material, such as paper; a metallic material, such as a metal foil; a woven or knit material, such as cotton or rayon blends; or a thermoset material, such as a polyester or aromatic polyamide film, or a web comprised of starch fibers. The central ply 30 can be another nonwoven having suitable properties for processing into an apertured ply. If central ply 30 has a melting point, it is preferably at least about 10 degrees Centigrade higher, more preferably about 20 degrees Centigrade higher than the outer plies. However, central ply 30 need not have a melting point, and may simply experience softening at the calendaring temperatures required to bond the laminate.

Apertured Embodiments

A further benefit is obtained when the non-apertured thermally bonded laminate first layer described above, is stretched or extended in a direction generally orthogonal to the longitudinal axis, 1, of melt bond sites 50. The melt bonding at the melt bond sites 50 tends to make localized weakened portions of the layer at the bond sites. Thus, as portions of the layer 10 are extended in a direction generally orthogonal to the longitudinal axis 1 of bond sites 50, the material at the bond site fails in tension and an aperture is formed. The relatively high aspect ratio of melt bond sites 50, permits a relatively large aperture to be formed upon sufficient extension. When the layer 10 is uniformly tensioned, the result is a regular pattern of a plurality of apertures 45 corresponding to the pattern of melt bond sites 50.

Figure 8:
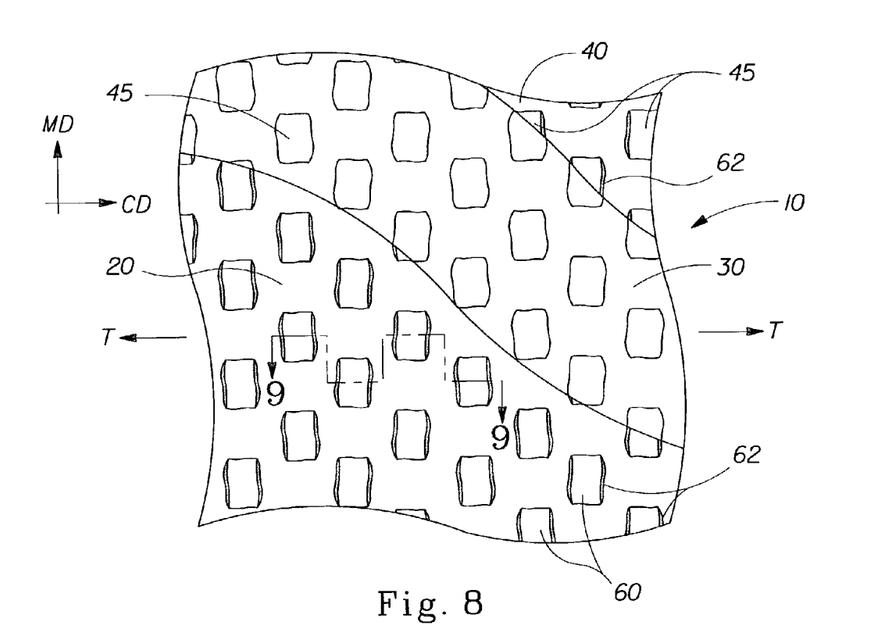
FIG. 8 is a top plan view of another embodiment of the first layer of the present invention.
Figure 9:
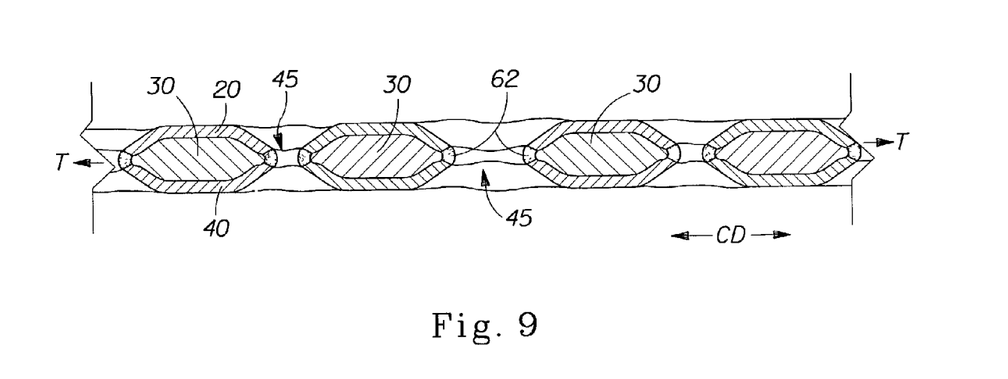
FIG. 9 is a cross-sectional view of a portion of the first layer shown in FIG. 8.

FIG. 8 shows a partially cut-away representation of an apertured laminate of the first layer of the present invention. As shown, the partial cut-away permits each ply to be viewed in a plan view. The first layer 10 shown in FIG. 8 is produced after the thermally bonded laminate is stretched in a direction orthogonal to the longitudinal axis of the melt bond sites, in this case, in the cross-machine direction, CD with sufficient elongation in the direction of extension to cause apertures to form. As shown, where formerly were melt bond sites 50, apertures 45 are produced as the relatively weak bond sites fail in tension. Also as shown, central layer 30 can remain generally uniformly distributed within laminate 10, depending on the material properties of central layer 30. For example, if central layer 30 is more extensible than outer layers 20 or 40, then it simply extends, either elastically or by plastic deformation, but remains generally uniformly distributed in the unapertured regions of web 10. For example, if a thermoplastic film is utilized as the central layer 30, it extends, either extensibly or elastically (depending on the type of film), but can remain generally uniform, for example, in density or basis weight.

When apertures 45 are formed, the thermally bonded portions of outer layers 20 and 40 remain primarily on the portions of the aperture perimeters corresponding to the length dimension of bond sites 50. Therefore, each aperture 45 does not have a perimeter of thermally bonded material, but only portions remain bonded, represented as 62 in FIG. 8. One beneficial property of such a laminate web is that once apertured, fluid communication with the central layer is facilitated. Thus, an absorbent central layer 30 can be used between two relatively non-absorbent outer layers.

To the extent that central layer 30 is involved, or participates, in any bonding between outer layers 20 and 40, it also participates in the remnant of bonded portions 62, as shown in FIG. 4. The involvement may be due to some degree of actual melt bonding about the perimeter of bond site 50 (e.g., for thermoplastic central layers 30), or it may be due to mechanical interaction, such as by entanglement (e.g., for cellulosic fibrous central layer 30 between fibrous nonwoven layers).

The first layer may also be extended as described with reference to FIG. 8, but with the central layer 30 chosen to have an elongation to break, less than either of the two outer layers, and less than the actual magnitude of extension. Thus, upon extension of the laminate web generally orthogonal to the longitudinal axis, 1, sufficient to form apertures in outer layers 20 and 40 (and thus the entire laminate web 10) central layer 30 fails in tension. Therefore, central layer 30 fractures (i.e., fails in tension) upon sufficient extension, such that after extension central layer 30 is no longer uniformly distributed over the non-apertured regions of the laminate web 10.

Figure 5:
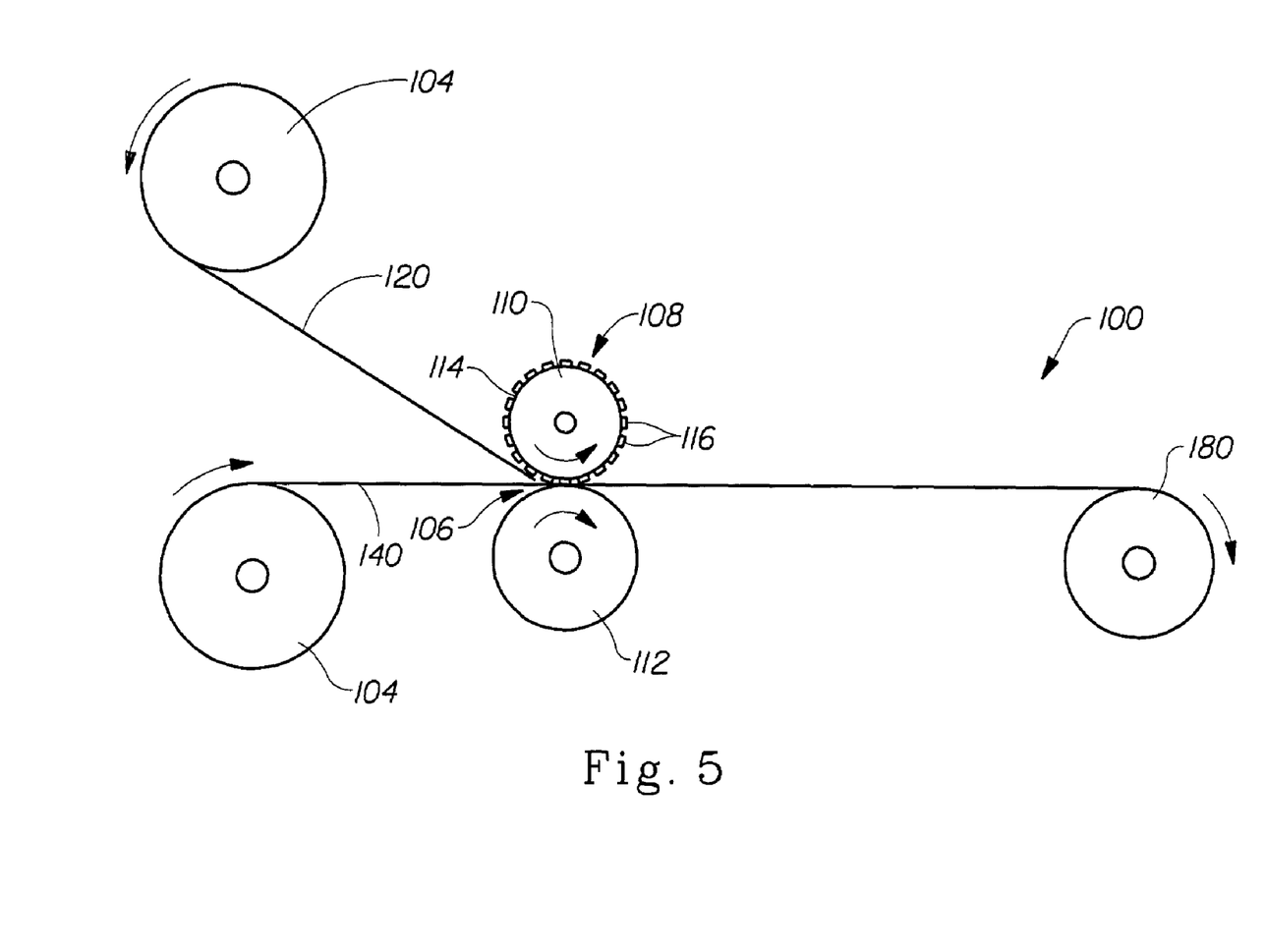
FIG. 5 is a schematic representation of a process for making a laminate article of the present invention.

One example of a web 10 having a structure similar to that shown in FIG. 5 is a web having outer layers of relatively extensible nonwovens, with a central layer of relatively low extensibility tissue paper. One particularly interesting structure incorporates a highly hydrophobic outer layer combined with a highly absorbent central layer. A suitable hydrophobic material is described in U.S. Pat. No. 3,354,022 Dettre et al. Such a material has a water repellent surface having an intrinsic advancing water contact angle of more than 90 degrees and an intrinsic receding water contact angle of at least 75 degrees. Such a material exhibits extremely hydrophobic properties, similar to the effect known to exist on leaves from the Lotus plant. When such a material is combined with an absorbent central layer, such as a BOUNTY® paper towel tissue layer, the resulting composite can be highly absorbent while retaining a very clean and dry outer surface. The basis weight and porosity of the outer layer can be varied to achieve different degrees of absorbent performance.

In general, for a first layer 10 having generally parallel rows of melt bond sites 50 extending in the machine direction MD, which correspondingly form generally parallel rows of apertures when extended, and having a central layer with a lower elongation to break than the outer layers, the resulting extended, apertured layer 10 is characterized by generally low basis weight, low density regions between the apertures in the machine direction, MD. Likewise, such a laminate web 10 is characterized by relatively high basis weight, high density regions between adjacent rows of apertures in the cross-machine direction, CD. By choice of central layer material 30 and possibly post laminating operations, e.g., an embossing process, the thickness of the laminate web can likewise be varied, the thicker regions generally corresponding to the higher density regions.

The Cellulosic Web:

The second layer is comprised of an absorbent cellulosic fibrous web. A cellulosic fibrous web is a fibrous, macroscopically two-dimensional and planar, although not necessarily flat. Such a web does have some thickness in the third dimension. However, this thickness is very small compared to the actual first two dimensions. Within the fibrous structure may be at least two regions distinguished by an intensive property such as basis weight, density; projected average pore size or thickness. Such a web is disclosed in U.S. Pat. No. 5,277,761, issued Jan. 11, 1994 to Van Phan et al and incorporated herein by reference.

The two-dimensional cellulosic webs are composed of fibers, which are approximated by linear elements. The fibers are components of the two-dimensional fibrous web, which components have one very large dimension (along the longitudinal axis of the fiber) compared to the other two relatively very small dimensions (mutually perpendicular, and both radial and perpendicular to the longitudinal axis of the fiber), so that linearity is approximated. While, microscopic examination of the fibers may reveal two other dimensions, which are small, compared to the principal dimension of the fibers, such other two small dimensions need not be substantially equivalent or constant throughout the axial length of the fiber. It is only important that the fiber be able to bend about its axis and be able to bond to other fibers.

The fibers may be synthetic, such as polyolefin or polyester; may be cellulosic, such as cotton linters, rayon or bagasse; or may be wood pulp, such as softwoods (gymnosperms or coniferous) or hardwoods (angiosperms or deciduous) or layers of the foregoing. As used herein, a fibrous web is considered "cellulosic" if the fibrous web comprises at least about 50 weight percent or at least about 50 volume percent cellulosic fibers, including but not limited to those fibers listed above. A cellulosic mixture of wood pulp fibers comprising softwood fibers having a length of about 2.0 to about 4.5 millimeters and a diameter of about 25 to about 50 micrometers, and hardwood fibers having a length of less than about 1 millimeter and a diameter of about 12 to about 25 micrometers has been found to work well for the fibrous webs described herein.

Such a web may be comprised of a single ply or of multiple plies. The layer may be embossed or nonembossed. Such a layer can be comprised of a tissue paper such as a BOUNTY® paper towel, available from The Procter & Gamble Co., Cincinnati, Ohio, USA. BOUNTY® paper towels are manufactured under the protection of U.S. Pat.

Nos. 4,529,480; 4,637,859; 4,687,153; 5,223,096; and 5,240,562; said patents being hereby incorporated by reference.

One of the beneficial characteristics in such an embodiment is that the BOUNTY® sheet retains much of its absorbency. The continuous web of the BOUNTY® is not disrupted by the discontinuous bonding pattern. Therefore the BOUNTY® sheet retains much of its absorbent capacity.

In one embodiment of the present invention, the third material that is disposed between the first and second plies of the first layer is also a cellulosic web. Preferably the cellulosic web of the third material has a basis weight ranging from about 20 gsm to about 50 gsm, and comprises a mixture of softwood pulp fiber and hardwood pulp fiber, preferably with the softwood comprising from about 50 to about 90 percent of the web, and the hardwood comprises from about 10 to 50 percent of the web. The cellulosic webs of the present invention could be produced by a through air drying process, by a conductive Yankee drying process, or any other paper manufacturing process known in the art. In one embodiment, a single ply of cellulosic web used as the third material of the first layer, and bonded to a sheet of BOUNTY® paper towel as the second layer. A representative BOUNTY® paper towel is made by a through air dried process and has a basis weight of 42 gsm and comprises 70% softwood and 30% hardwood fibers. The absorbent rate of such an embodiment is equivalent to the absorbent rate of two sheets of BOUNTY®. The absorbent capacity of this embodiment exceeds that of an equivalent amount of cellulosic material alone. This is surprising because the embodiment contains less absorbent cellulosic structure than two sheets of BOUNTY® and the nonwoven plies of the first layer do no add absorbent capacity.

The first layer is also more durable than the second layer and therefore can function as a cleaning surface to enable more mechanically intensive cleaning with the article than is possible with a cellulosic wipe such as a paper towel. The use of nonwoven outer plies in the first layer results in a soft outer surface in the present invention.

In one embodiment, the cellulosic second layer also comprises an outer layer of the invention. Such an embodiment demonstrates a high rate of absorption due to the direct exposure of the absorbent cellulosic web to fluids.

Three Layer Embodiment

A third layer, substantially similar, or identical, to the first layer may also be added as an outer layer. In such an embodiment, the second layer is disposed between the first and third layers. In such an embodiment, the second layer is bonded to each of the first and third layers without aperturing the second layer.

Such an embodiment has the advantage of a soft clothlike feel on both sides of the article. Additionally, when the third material of the third layer is a cellulosic web the article gains additional absorbent capacity.

Method of Making:

The laminate article is further characterized in that the joining of the two layers into a unitary web can be achieved in the absence of adhesive. That is, in certain embodiments no adhesive is required to bond the layers together; joining is achieved by the input of energy into the constituent layers, such as by thermal melt bonding of the two layers together at the melt bond sites. In other embodiments, the energy input can be via ultrasonic bonding, by infrared bonding, or by pressure bonding. Accordingly, a significant benefit of the present invention is the provision of a laminate article, that is a unitary article, formed without the use of adhesives. Not only does this simplify processing and lower the cost of the laminate article, it results in a more flexible, softer article.

FIG. 5 schematically illustrates a process for making the laminate article of the present invention. A first layer 120, is unwound from a supply roll 104, and travels in a direction indicated by the arrows associated therewith as the supply roll 104 rotates in the direction indicated by the arrows associated therewith. Likewise a second layer 140, is unwound from supply roll 105. The two components (or more, if more than two layers are used) pass through a nip 106 of the thermal point bond roller arrangement 108 formed by rollers 110 and 112.

Figure 6:
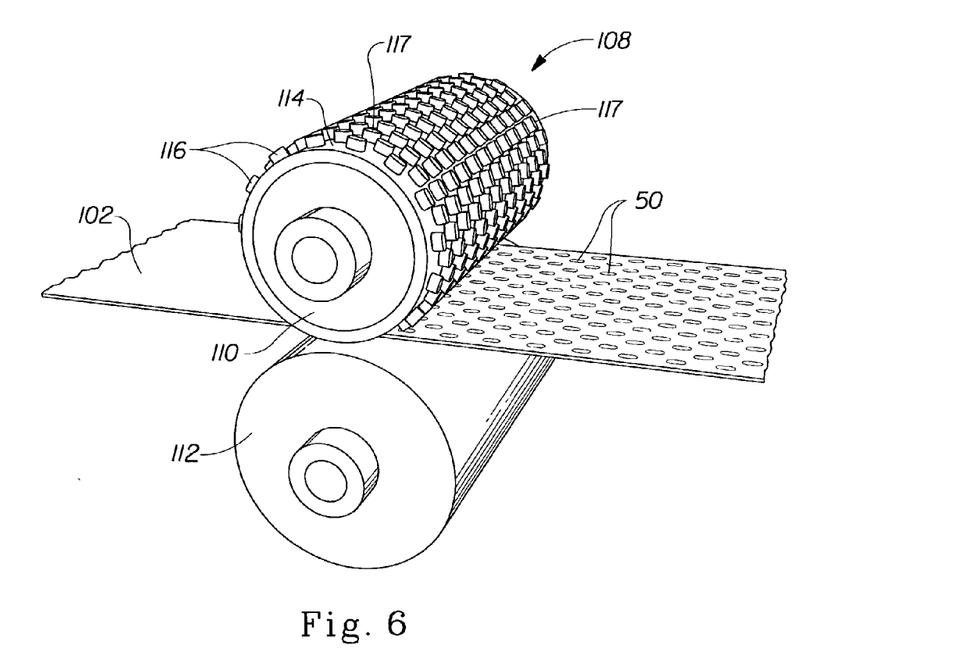
FIG. 6 is a perspective view of a melt bond calendaring apparatus.

Referring to FIGS. 5 and 6, the nonwoven thermal bond roller arrangement 108 comprises a patterned calendar roller 110 and a smooth anvil roller 112. Roller 112, may be a smooth right circular stell cylinder, and may have a coating of, for example, urethane. wRoller 112 may alternatively be a matched pattern roller. One or both of the patterned calendar roller 110 and the roller 112 may be heated and the temperature of either roller and the pressure between the two rollers may be adjusted by well known means to provide the desired temperature, if any, and pressure to melt bond the two layers together at a plurality of bond sites.

The patterned calendar roller 110 is configured to have a circular cylindrical surface 114, and a plurality of protuberances or pattern elements 116 which extend outwardly from surface 114. The protuberances 116 are disposed in a predetermined pattern with each protuberance 116 being configured and disposed melt bond the two outer layers together at a plurality of locations. One pattern of protuberances is shown schematically in FIG. 4B.

As shown in FIG. 6, patterned calendar roller 110 can have a repeating pattern of protuberances 116 which extend about the entire circumference of surface 114. Alternatively, the protuberances 116 may extend around a portion, or portions of the circumference of surface 114.

The height of the protuberances should be selected according to the thickness of the laminate being bonded. In general, the height dimension should be greater than the maximum thickness of the laminate web during the calendaring process, so that adequate bonding occurs at the bond sites, and only at the bond sites.

Figure 7:
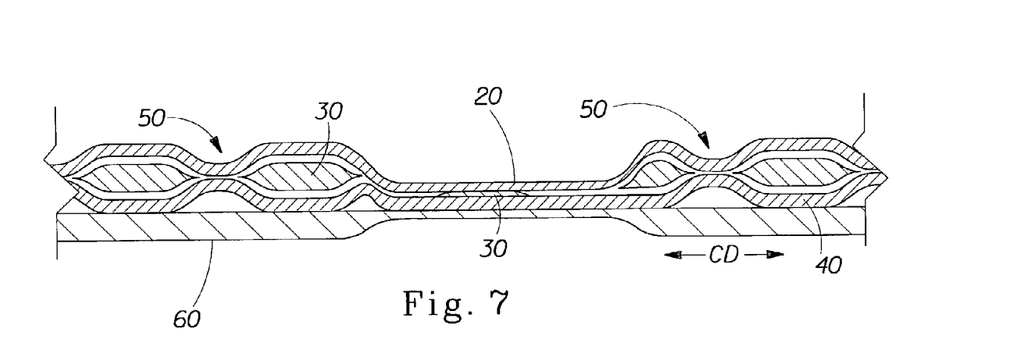
FIG. 7 is a cross sectional view of the laminate article of the present invention.

After passing through nip 106, the two (or more) component webs 120, and 140 have been formed into unitary laminate web 10. At this point in the process the outer layers are thermally bonded to each other and unapertured, as shown in FIGS. 1 and 7.

What is claimed is:

1. A multi-layer article comprising:
 a first layer comprising:
  a) a first ply;
  b) a second ply joined to the first ply in a face to face relationship at a plurality of discrete bond sites, the first and second plies forming an interior region therebetween;
  c) a third material being disposed between the first and second plies, the third material being differentiated from the first or second ply by at least one material property selected from the group consisting of thermal properties, elongation properties, elastic properties, and conductive properties, the third material substantially filling the interior region; and
  d) the third material being apertured in regions coincident with the bond sites, such that the first and second plies are joined through the apertures;
 a second layer comprising a continuous cellulosic web;
 a third layer comprising:

a) a first ply;

b) a second ply joined to the first ply in a face to face relationship at a plurality of discrete bond sites, the first and second plies forming an interior region therebetween;

c) a third material being disposed between the first and second plies, the third material being differentiated from the first or second ply by at least one material property selected from the group consisting of thermal properties, elongation properties, elastic properties, and conductive properties, the third material substantially filling the interior region; and d) the third material being apertured in regions coincident with the bond sites, such that the first and second plies are joined through the apertures;

wherein the second layer is disposed between the first layer and the third layer; and, wherein the first layer is bonded to the second layer and the second layer is bonded to the third layer.

2. The multi-layer article of claim 1, wherein the third material of the first layer and the third material of the third layer are cellulosic.

3. The multi-layer article of claim 2 wherein the first, second, and third layers are joined at a predetermined pattern of discrete bond sites.

4. The multi-layer article of claim 1 wherein:

a) the first and second plies of the first layer and the third layer are further comprised of thermoplastic fibers; and b) the first, second, and third layers are thermally bonded without the addition of an adhesive.

5. The multi-layer article of claim 1 wherein the first layer is apertured.

6. The multi-layer article of claim 5 wherein the third material of the first layer is a cellulosic web.

7. The multi-layer article of claim 6 wherein:

a) the first and second plies of the first layer and the third layer are further comprised of thermoplastic fibers; and b) the first, second, and third layers are thermally bonded without the addition of an adhesive.

8. The multi-layer article of claim 5 wherein the first layer and the second layer are joined together at a predetermined pattern of discrete bond sites.

9. A multi-layer article comprising:

a first layer comprising:

a) a first ply;

b) a second ply joined to the first ply in a face to face relationship at a plurality of discrete bond sites, the first and second plies forming an interior region therebetween;

c) a third material being disposed between the first and second plies, the third material being differentiated from the first or second ply by at least one material property selected from the group consisting of thermal properties, elongation properties, elastic properties, and conductive properties, the third material substantially filling the interior region; and d) the third material being apertured in regions coincident with the bond sites, such that the first and second plies are joined through the apertures;

wherein the first layer is apertured;

a second layer comprising a continuous cellulosic web;

a third layer comprising:

a) a first ply;

b) a second ply joined to the first ply in a face to face relationship at a plurality of discrete bond sites, the first and second plies forming an interior region therebetween;

c) a third material being disposed between the first and second plies, the third material being differentiated from the first or second ply by at least one material property selected from the group consisting of thermal properties, elongation properties, elastic properties, and conductive properties, the third material substantially filling the interior region; and d) the third material being apertured in regions coincident with the bond sites, such that the first and second plies are joined through the apertures;

wherein the third layer is apertured;

wherein the second layer is disposed between the first layer and the third layer; and, wherein the first layer is bonded to the second layer and the second layer is bonded to the third layer.

10. The multi-layer article of claim 9 wherein the third material of the first layer and the third material of the third layer are cellulosic.

11. The multi-layer article of claim 10 wherein the first, second, and third layers are joined at a predetermined pattern of discrete bond sites.

12. The multi-layer article of claim 9 wherein:

a) the first and second plies of the first layer and the third layer are further comprised of thermoplastic fibers; and b) the first, second, and third layers are thermally bonded without the addition of an adhesive.

* * * * *